(12) United States Patent
Schulz et al.

(10) Patent No.: US 11,790,291 B2
(45) Date of Patent: Oct. 17, 2023

(54) AUTOMATED MAINTENANCE SCHEDULE GENERATION METHOD FOR MODULAR PLANTS

(71) Applicant: ABB Schweiz AG, Baden (CH)

(72) Inventors: Dirk Schulz, Meckenheim (DE); Mario Hoernicke, Landau (DE)

(73) Assignee: ABB Schweiz AG, Baden (CH)

( * ) Notice: Subject to any disclaimer, the term of this patent is extended or adjusted under 35 U.S.C. 154(b) by 137 days.

(21) Appl. No.: 17/398,026

(22) Filed: Aug. 10, 2021

(65) Prior Publication Data

US 2021/0365852 A1 Nov. 25, 2021

Related U.S. Application Data

(63) Continuation of application No. PCT/EP2020/053562, filed on Feb. 12, 2020.

(30) Foreign Application Priority Data

Feb. 12, 2019 (EP) ..................................... 19156742

(51) Int. Cl.
*G06Q 10/0631* (2023.01)
*G06Q 10/20* (2023.01)
*G06Q 50/04* (2012.01)

(52) U.S. Cl.
CPC ......... *G06Q 10/0631* (2013.01); *G06Q 10/20* (2013.01); *G06Q 50/04* (2013.01)

(58) Field of Classification Search
CPC ........................................... G06Q 10/00–50/00
USPC ................................................. 705/7.11–7.42
See application file for complete search history.

(56) References Cited

U.S. PATENT DOCUMENTS

| | | | |
|---|---|---|---|
| 10,762,475 B2* | 9/2020 | Song | G06Q 10/067 |
| 2002/0129566 A1* | 9/2002 | Piccolo | E04H 5/02 |
| | | | 52/143 |
| 2003/0130755 A1* | 7/2003 | Bazzocchi | G06Q 10/06 |
| | | | 700/99 |
| 2003/0172002 A1* | 9/2003 | Spira | G06Q 30/0601 |
| | | | 705/26.1 |
| 2006/0042543 A1* | 3/2006 | Funk | H01L 22/20 |
| | | | 118/712 |
| 2007/0050070 A1* | 3/2007 | Strain | G06Q 10/06 |
| | | | 700/99 |

(Continued)

*Primary Examiner* — Alan S Miller
(74) *Attorney, Agent, or Firm* — Leydig, Voit & Mayer, Ltd.

(57) ABSTRACT

An automated maintenance schedule generation method includes: receiving planning data for designing a modular plant comprising physical modules as received planning data; selecting digital modules, correlating to respective physical modules, from a database, depending on the received planning data as respective correlating physical modules, the digital modules including maintenance information of the respective correlating physical modules; associating the selected digital modules depending on the received planning data; determining an expected maintenance need including an expected maintenance issue and/or an expected maintenance issue date for the selected physical modules depending on the received maintenance information as a determined maintenance need; and generating a maintenance schedule for the modular plant depending on the determined maintenance need.

17 Claims, 2 Drawing Sheets

(56) References Cited

U.S. PATENT DOCUMENTS

| | | | |
|---|---|---|---|
| 2007/0229251 A1* | 10/2007 | Ehrman | G06Q 10/06312 |
| | | | 340/539.1 |
| 2016/0247129 A1* | 8/2016 | Song | G06Q 10/20 |
| 2017/0286572 A1* | 10/2017 | Hershey | B64F 5/60 |
| 2018/0039261 A1* | 2/2018 | Haller | G05B 23/0267 |
| 2018/0240080 A1* | 8/2018 | Misra | G06Q 50/30 |
| 2019/0147413 A1* | 5/2019 | Johnson | G06Q 10/063 |
| | | | 705/305 |
| 2019/0163173 A1* | 5/2019 | Goldschmidt | H04L 63/00 |
| 2019/0176862 A1* | 6/2019 | Kumar | B61L 15/0081 |
| 2021/0302950 A1* | 9/2021 | Hoernicke | G05B 19/41885 |

* cited by examiner

AUTOMATED MAINTENANCE SCHEDULE GENERATION METHOD FOR MODULAR PLANTS

CROSS-REFERENCE TO PRIOR APPLICATION

This application is a continuation of International Patent Application No. PCT/EP2020/053562, filed on Feb. 12, 2020, which claims priority to European Patent Application No. EP 19156742.9, filed on Feb. 12, 2019. The entire disclosure of both applications is hereby incorporated by reference herein.

FIELD

The invention relates to an automated maintenance schedule generation method for modular plants, a control device, a computer program and a computer-readable data carrier.

BACKGROUND

Modular plants are assembled from a variety of pre-owned, used, or refurbished modules. Besides efficient engineering and flexible production, this re-use is also a matter of asset optimization. However, the maintenance need of a newly assembled modular plant is hard to predict, leading to an operational availability risk.

In today's non-modular plants, maintenance of devices and equipment must be planned with some manual effort in a dedicated planning process.

Today, preventive maintenance requires an overview of all devices, active and passive equipment inside of the plant to become available to maintenance planning. Predictive maintenance requires further knowledge about any of these parts to be implemented into prediction logic. For larger processes, considering operational targets requires knowledge of the process topology to identify (in)dependent parts of the process from a production perspective.

Modular automation suggests that continuous production processes can be set up from physical modules, where each module implements a generic process function such as mixing, heating, pumping, or more complex units such as bio-reactors. Plants are build and adapted from a stock of such generic modules, which are taken from stock owned by the process owner or leased from a module rental company.

Still, introducing preventive or predictive maintenance for modular automation requires the same integration effort as for traditional plants. In addition, asset (module) health conditions are much more diverse and harder to predict.

Regarding Uncertainties on Module Health:

While the re-use of modules (production assets) is economically efficient, it also means a particular plant is made from used and refurbished equipment in different state of maintenance need. However, this information is not readily available beforehand, i.e. when selecting modules to form a new plant. These modules might still be operational in another plant or sit in storage in offline-mode, i.e. direct communication with them is not possible to determine their condition. Simply checking their maintenance history in a Computerized Maintenance Management System—CMMS—would simply support a preventive maintenance approach.

This means that when selecting modules to form a new plant, there is an uncertainty with regard to the maintenance need already at day one of production. One of the benefits of modular automation, setting up new production processes quickly for a limited time to satisfy an unexpected market demand, would be at risk. Even though a faulty module can more easily replaced than in a traditional plant, the production process would have to be partly shut down, which is economically prohibitive e.g. in bio-chemicals or pharma productions.

SUMMARY

In an embodiment, the present invention provides an automated maintenance schedule generation method, comprising the steps: receiving planning data for designing a modular plant comprising physical modules as received planning data; selecting digital modules, correlating to respective physical modules, from a database, depending on the received planning data as respective correlating physical modules, the digital modules comprising maintenance information of the respective correlating physical modules; associating the selected digital modules depending on the received planning data; determining an expected maintenance need comprising an expected maintenance issue and/or an expected maintenance issue date for the selected physical modules depending on the received maintenance information as a determined maintenance need; and generating a maintenance schedule for the modular plant depending on the determined maintenance need.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

In an embodiment, the present invention provides an improved automated maintenance schedule generation method for modular plants.

According to an aspect, the automated maintenance schedule generation method for modular plants comprises the steps:

receiving planning data for designing a modular plant comprising physical modules;

selecting digital modules, correlating to the respective physical modules, from a database, depending on the received planning data, wherein the digital modules comprise maintenance information of the respective physical modules;

associating the selected digital modules depending on the received planning data;

determining an expected maintenance need comprising an expected maintenance issue and/or an expected maintenance issue date for the selected physical modules depending on the received maintenance information; and generating a maintenance schedule for the modular plant based on the determined maintenance need.

Preferably, the digital module comprises a modular type package—MTP—. The modular type package contains all necessary information to integrate a module into a modular plant, such as the communication, the services, a human machine interface—HMI-description and the maintenance information.

Preferably, the selected digital modules are known assets, in particular to a computerized maintenance management system—CMMS—, configured for generating the maintenance schedule for the modular plant. Thus, the digital modules can be handled efficiently.

For any specific modular plant, a full maintenance schedule can be automatically generated at design time.

In other words, the digital module represents a physical module, wherein the digital module comprises additional information, for example maintenance information, of the physical module.

Preferably, the maintenance schedule is automatically generated, for example by a CMMS, based on the planning data, in particular the selected digital modules. Preferably, the maintenance schedule comprises information about the production of the modular plant that is formed by the selected physical modules. In other words, the maintenance schedule indicates for each physical module, when the physical module is expected to be operable and when it is expected to be under maintenance and thus cannot be operated. Preferably, the maintenance schedule comprises a list of selected digital modules, relating to physical modules forming the modular plant, wherein for each selected digital module the respective maintenance need is indicated.

In other words, the maintenance schedule comprises a compilation, of maintenance need that will occur when operating the modular plant in the selected composition of physical modules.

Preferably, the maintenance need comprises maintenance time data, indicating when a maintenance need will occur, and/or maintenance type data, indicating what the maintenance need will be.

Preferably, the maintenance need for the selected digital modules is predicted based on the received maintenance information.

Preferably, the planning data comprises the amount and type of physical modules necessary for the modular plant.

Preferably, the impact of maintenance on the production of the plant is considered by interpreting the process connectivity. The maintenance schedule preferably considers having parts of the physical modules of the plant continuing to operate, maintaining them one after another based on the operation of the plant.

Preferably, changing maintenance information of the digital module is updated and exported to the database. Therefore, when selling the physical module or returning the physical module at the end of a lease, the respective digital module is up to date.

Thus, a maintenance schedule can be generated automatically. This reduces effort to support a mandatory maintenance process in a plant, and thus helps lowering operational risk.

Thus, the maintenance schedule can be generated in a predictive and preventive manner instead of a reactive manner.

Thus, the generation and update of precise, predictive maintenance schedules is automated. This saves manual effort. Additionally, it yields plannability of maintenance and downtime.

Preferably, the database comprises a module library and/or a marketplace.

The digital modules, in particular the module type packages, are preferably collected in a module library. However, digital modules also may be provided externally, in particular by a market place.

Preferably, the digital module is provided by a module vendor, in particular in case of a refurbished physical module and/or from a module rental company, from which the physical module is leased.

Thus, a wide variety of digital modules can be used.

In a preferred embodiment, the method comprises the steps:

generating the maintenance schedule by a computerized maintenance management system—CMMS-; and calculating an expected production downtime of maintenance and/or an expected direct costs of maintenance by the computerized maintenance management system.

Preferably the maintenance schedule is provided to a Manufacturing Execution System—MES—in charge of production scheduling, to calculate and provide the indirect cost of maintenance due to production downtime in general and/or delays of specific customer orders Thus, the expected downtime of maintenance and/or the expected partial or total costs of maintenance can be provided automatically. This saves manual effort and lowers operational risk. Additionally, it yields plannability of maintenance and downtime.

In a preferred embodiment, the maintenance information comprises an age of the physical module, preventive maintenance cycles of the physical module, lease costs of the physical module, availability of predictive maintenance support of the physical module, a maintenance history of the physical module, recurring issues of the physical module, a model usage history of the physical module and/or a last known condition data of the physical module.

The maintenance history preferably comprises historic maintenance cycles and/or untypically high maintenance needs of the physical module.

The recurring issues preferably comprises historic maintenance issues and/or historic maintenance issue dates of the physical module.

Preferably, the maintenance history and/or the recurring issues of the physical module are provided by a computerized maintenance management system—CMMS—.

Preferably a model usage history of the physical module comprises for which production the physical module was used in the past. Further preferably, a physical module, which was in contact with a substance known for triggering allergic reactions with customers, for example peanuts, should not, or under special constraints, be used for production of antiallergic products.

Preferably, dependent on the module usage history an initial maintenance need, in particular a cleaning procedure to be performed prior to setting up the module plant, is identified and scheduled.

The last known condition data of the physical module relates to specific conditions affecting the maintenance information of the physical module to be used for the modular plant.

Thus, the generation of the maintenance schedule can be improved.

In a preferred embodiment, the maintenance need comprises initial and/or repeated cleaning of the physical module between each production run and/or unavoidable reconfiguration of the modular plant.

Preferably, maintenance needs such as repeated cleaning of modules are inherent part of the production process, for example when producing medication such as individualized cancer medication for chemo-therapy, which require cleaning between each production run, are used to calculate inherent maintenance needs (e.g. by a CMMS), in order to calculate added indirect cost of production and expected production performance; this information can also be used to select modules, e.g. choosing a more expensive module that cleans faster in case of products that require repeated cleaning during production.

In some production processes it is unavoidable to reconfigure at least part of the modular plant. Therefore, choosing a more expensive module that can be added or removed from the modular plant faster could improve the maintenance schedule.

Thus, the generation of the maintenance schedule can be improved.

In a preferred embodiment, the method comprises the step:

generating the maintenance schedule before the modular plant is assembled and the physical modules start communicating.

Thus, the maintenance schedule can be automatically generated already at design time.

In a preferred embodiment, the method comprises the step:

providing a simulation model of the digital module, configured for predicting the maintenance need.

Thus, a prediction function of the maintenance need can be provided independent of concurrent access to the physical module.

Thus, further operational risk is mitigated.

Thus, the generation and update of precise, predictive maintenance schedules is automated. This saves manual effort. Additionally, it yields plannability of maintenance and downtime.

In a preferred embodiment, the method comprises the step:

receiving the simulation model from an external source, preferably, from a module vendor, in particular for a refurbished physical module and/or from a module rental company, in particular from which the physical module is leased.

Thus, the simulation model of the digital module does not have to be created multiple times.

In a preferred embodiment, the method comprises the step:

receiving the predicted maintenance need from the selected physical module itself.

Preferably, the physical modules provide predictive maintenance functions for predicting the expected maintenance need of the respective physical module themselves and further preferably expose the maintenance need online.

Thus, the expected maintenance need does not have to be predicted afterwards.

In a preferred embodiment, the method comprises the steps:

suggesting physical modules from a pool of available physical modules depending on the received planning data, wherein the planning data comprises planning constraints, which the design of the modular plant has to fulfil; and selecting digital modules, correlating to the respective physical modules, from the suggested physical modules.

In a preferred embodiment, the planning constraints comprise an age of the module, a time to maintenance of the physical module, a time to repair the physical module, costs of the physical module and/or availability of predictive maintenance support of the physical module.

In a preferred embodiment, the method comprises the steps:

receiving production targets of the modular plant having to be achieved by the design of the modular plant;

validating the generated maintenance schedule offline, based on the production targets, thereby providing offline validation data; and adjusting the selection of digital modules for the modular plant based on the offline validation data.

Validating the generated maintenance schedule offline based on the production target is preferably understood as checking if the generated maintenance schedule is suitable to achieve the production targets.

Preferably, the digital module stores the maintenance information about the related physical module. Thus, physical modules with unsuitable maintenance needs can be excluded from the scheduling already at design time.

Preferably, the production target comprises a production time window, for example 2 month, in which the plant hast to be producing and must not be interrupted by maintenance of one of the physical modules. Preferably, digital modules with expected maintenance need during the production time window are excluded.

Preferably, the digital module comprises a bill of component material of the physical module. Further, preferably, the costs of spare parts can be considered by generating the maintenance schedule. This is in particular useful when the engineering process of the plant is modular and the physical plant is not modular.

Preferably, the production target comprises a constraint for the maintenance schedule finding a maintenance timing, in which all physical modules are maintained together and/or a constraint for the maintenance schedule with a time period without any maintenance that is as long as possible.

Thus, the generation and update of precise, predictive maintenance schedules is automated. This saves manual effort and allows for early validation of maintenance and/or production schedules. Additionally, it yields plannability of maintenance and downtime.

In a preferred embodiment, the method comprises the steps:

receiving online condition data of the physical modules relating to a real condition of the physical modules in view of its maintenance needs when the modular plant is assembled and the physical modules start communicating;

validating the generated maintenance schedule based on the online condition data online, thereby providing online validation data; and adjusting the selection of physical modules for the modular plant based on the online validation data.

Preferably, if the physical modules cannot be changed in view of the plant operation, the operator of the plan is provided with a proposal of an adjusted use of the physical modules, for example stressing the relevant physical modules less.

Thus, the generation and update of precise, predictive maintenance schedules is automated. This saves manual effort and allows for early validation of maintenance and/or production schedules. Additionally, it yields plannability of maintenance and downtime.

In a preferred embodiment, the method comprises the steps:

checking, if adjusting the selection of physical modules is possible in view of the operation of the modular plant; and suggesting an adjustment of operation of the modular plant, if adjusting the selection of the physical modules is not possible.

Preferably, a purchase or a leasing of a physical module suitable for the maintenance schedule is suggested. Further preferably, the suggestion is dependent on a vendor catalogue, a delivery time for the physical module and/or a cost for the physical module.

According to an aspect, the control device is configured for executing the method as described herein.

In an advantageous embodiment, the control device comprises a computerized maintenance management system—CMMS- and/or a distributed control system—DCS Preferably, a computer program comprises instructions, which, when the program is executed by a computer, cause the computer to carry out the method as described herein Preferably, a computer-readable data carrier is provided having stored thereon the computer program as described herein.

Figure 1:
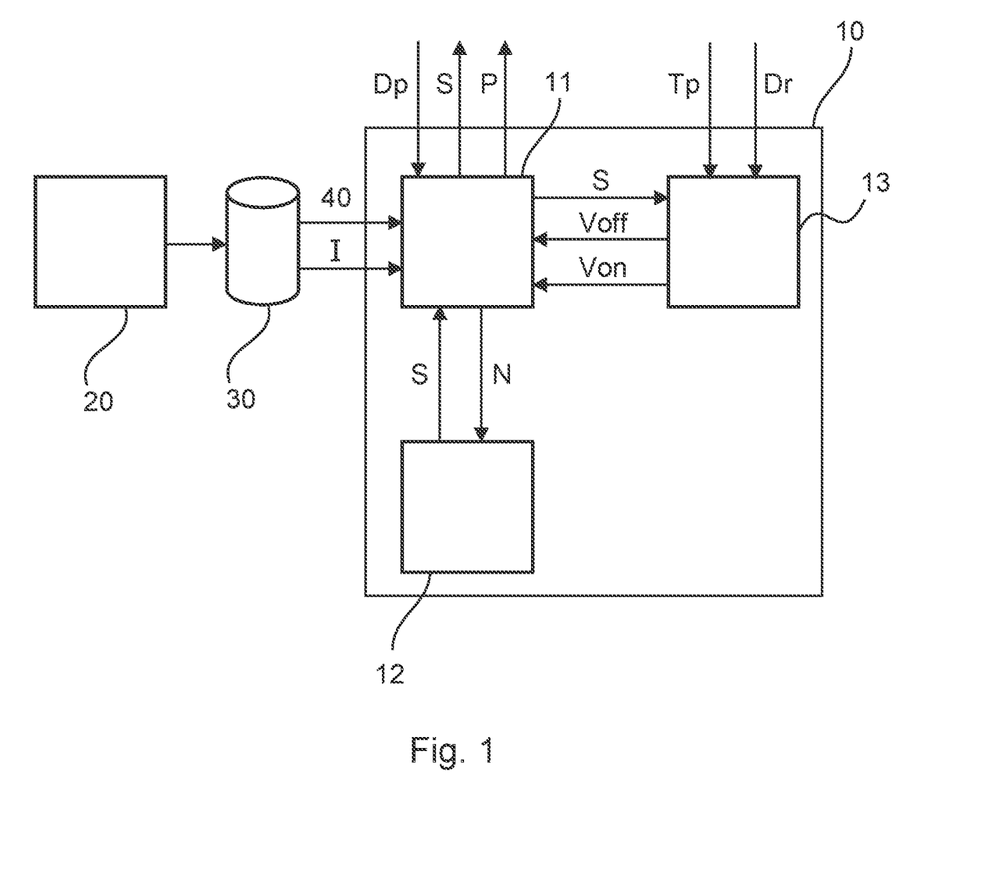
FIG. 1 schematically shows a control device.

FIG. 1 shows a control device 10 with a control unit 11, in this case a distributed control system—DCS—, a schedule unit 12, in this case a computerized maintenance management system—CMMS- and a validation unit 13.

Furthermore, a database 30 is shown, which contains digital modules 40, correlating to physical modules 20, and maintenance information I of the physical modules 20. The digital modules 40 and the maintenance information I are stored in the database 30 as module type packages—MTP—. The physical modules 20 comprise any physical unit that can be used as a part in a plant, in particular a modular plant. For example, physical modules 20 comprise pumps, boilers and/or condensers.

Each physical module 20 is digitally reproduced by a digital module 40. When a new production plant should be engineered, it has to be decided, which different physical modules 20 are available and suitable to form the plant. In order to manage the maintenance of the different physical modules 20, a maintenance schedule S has to be generated. The maintenance schedule S contains a schedule of the maintenance of all physical modules 20 used for the plant.

In a first step, planning data Dp is provided to the control unit 11, which comprises the information, which physical modules 20, in particular which type and which amount of physical modules 20, is needed for the plant. Just as an example, two boilers and two pumps are needed for the plant.

The control unit 11 then automatically suggests digital modules 40, correlating to the respective physical modules 20, from a pool of available physical modules 20 depending on the design of the plant reflected by the planning data Dp. The pool of available physical modules 20 are preferably physical modules 20 available in a self-owned stock, offered by a module vendor for refurbished physical modules 20, a module rental company, from which the physical module 20 is leased and/or physical modules 20 owned, but at used at the time. The database 30, comprising a library about self-owned physical modules 20 as well as marketplaces of module vendors and module rental companies, contains digital modules 40. The suggested digital modules 40 in this example for a plant of two boilers and two pumps comprise several boilers and pumps, which are available in stock, can be leased or bought and/or are in operation right now, but are available, when the plant is to be set up. The digital modules 40 in this case are module type packages—MTP—comprising maintenance information I of the respective digital modules 40. The maintenance information I for example comprises the age of the physical module, preventive maintenance cycles of the physical module, which is the regular time frame in which the specific physical module 20 has to be maintained for preventive reasons, lease costs of the physical module, availability of predictive maintenance support of the physical module, a maintenance history of the physical module, recurring issues of the physical module and/or a last known condition data of the physical module.

The control unit 11 then selects digital modules 40 from the suggested digital modules 40 based on planning constraints, which are part of the planning data. For example, the control unit 11 would select the two boilers and the two pumps with the lowest age. However, for example, the planning constraints comprise that a preventive maintenance of at least 6 month should be applicable to the physical modules 20. Therefore, the control unit 11 selects the two boilers and two pumps, which have a preventive maintenance of at least 6 month.

The selected digital modules 40 are then associated by the control unit 11 to the modular plant depending on the planning data.

Based on the maintenance information I, an expected maintenance need N for the selected digital modules 40 is determined by the control unit 11. The maintenance information additionally comprises additional information from the CMMS 12 from earlier schedules, such as a maintenance history, recurring issues and/or a last known condition data of the physical modules. In addition, for each digital module 40, a simulation of the module is executed for the purpose of predicting maintenance needs N. When there is no simulation of the module available, the maintenance need N is predicted based on the maintenance information I.

Based on the maintenance need N provided by the control unit 11, in other words, which maintenance issue will occur to which time, the schedule unit, in this case CMMS 12, automatically generates a maintenance schedule S for the modular plant.

The maintenance schedule S is then provided back to the control unit 11, which provides the maintenance schedule S to the validation unit 13. The validation unit 13 is provided with production targets. The validation unit 13 provides offline validation data Voff, stating, if the provided maintenance schedule S is in line with the production targets. The production targets Tp for example comprises a production time window, for example 2 month, in which the plant has to be producing and must not be interrupted by maintenance of one of the physical modules 20. Preferably, digital modules 40 with expected maintenance needs N during the production time window should then be excluded.

The offline validation data Voff is then provided to the control unit 11, which reselects the digital modules 40. This chain of steps is repeated until the offline validation data Voff does not object the maintenance schedule S and the maintenance schedule S is provided for external use.

The plant is then physically set up with the physical modules 20 that were selected by the control unit 11. When the physical modules 20 are online and communicate with each other, online condition data Dr is available, which is provided to the validation unit 13.

The validation unit 13 then provides online validation data Von to the control unit 11. In this example, a physical module 20, has a worse condition than expected and expectedly needs an earlier maintenance as set up in the maintenance schedule S. The control unit 11 either selects a new digital module 40 in order to swap the corresponding physical module 20 with the physical module 20 having a bad condition, or provides proposed instructions P for the operator of the plant that this specific physical module 20 has to be treated with caution, for example by not stressing the physical module 20 as planned.

Thus, an automated maintenance method for modular plant can be provided.

Figure 2:
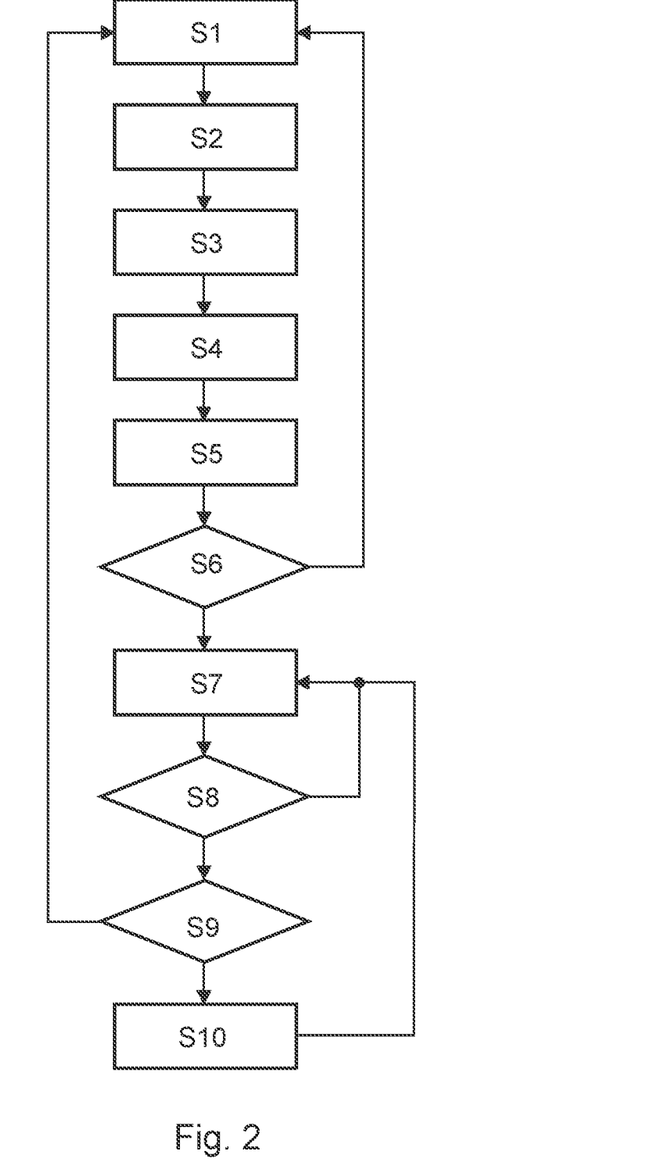
FIG. 2 shows a flow chart of an exemplary automated maintenance method for modular plants.

FIG. 2 shows a flow chart of an exemplary automated maintenance method for modular plants.

In a first step S1, planning data for designing a modular plant comprising physical modules 20 are received.

In a next step S2, digital modules 40, correlating to the respective physical modules 20, from a database 30, are selected depending on the received planning data Dp, wherein the digital modules 40 comprise maintenance information I of the respective physical modules 20.

In a next step S3, the selected digital modules 40 are associated depending on the received planning data Dp.

In a next step S4, an expected maintenance need N is determined comprising an expected maintenance issue and/or an expected maintenance issue date for the selected physical modules 20 depending on the received maintenance information I.

In a next step S5, a maintenance schedule S for the modular plant is generated depending on the determined maintenance need N.

In a next step S6, the generated maintenance schedule S is validated offline, based on the production targets Tp, thereby providing offline validation data Voff. If the production targets Tp are met by the maintenance schedule S, the method jumps to step S7. However, if the production targets Tp are not met by the maintenance schedule S, the method jumps back to step S2, where the selection of the digital modules 40 is adjusted.

In a next step S7, online condition data Dr of the physical modules 20 are received when the modular plant is assembled and the physical modules 20 start communicating.

In a next step S8, the generated maintenance schedule S is validated based on the online condition data Dr online, thereby providing online validation data Von. If depending on the online validation data Von the maintenance schedule S is determined as valid, the method jumps to step S9. If the maintenance schedule S is determined invalid, the method jumps to step S7, where the plant is operating normally and the online condition data Dr is updated on a predetermined time frame. For example, the online condition data Dr is requested once a week.

In a next step S9, it is checked, if the adjustment of the selection of the physical module is possible. Step S9 is only reached, if the online validation data Von determine that the maintenance schedule S is invalid. Therefore, action has to be taken in order to prevent the maintenance schedule S to fail. If an adjustment of the selection of the physical module 20 is possible, the method jumps to step S1. In this case, the physical module 20, which has a worse real condition than expected depending on the online condition data Dr, is swapped for a different physical module 20. The maintenance schedule S is then generated as described. In case it is not possible to adjust the selection of physical modules 20, for example, because the operation of the plant must not be interrupted, the method jumps to stop S10

In step S10 an adjustment of operation of the modular plant is suggested, if adjusting the selection of the physical modules 20 is not possible. For example, the operator of the plant is instructed to use the physical module 20 with worse real condition with reduced load or stress in order to still be able to fulfil the generated maintenance schedule S without failure of said physical module 20. The selection of physical modules 20 therefore can be prevented.

Preferably, the functional modules and/or the configuration mechanisms are implemented as programmed software modules or procedures, respectively; however, one skilled in the art will understand that the functional modules and/or the configuration mechanisms can be implemented fully or partially in hardware.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SYMBOLS 10 control device
11 control unit (distributed control system)
12 schedule unit (computerized maintenance management system)
13 validation unit
20 physical module
30 database
40 digital module
I maintenance information
Dp planning data
Tp production target
Dr online condition data
Von online validation data
Voff offline validation data
maintenance schedule
N maintenance needs
P proposed instructions to the operator of the plant
S1 receiving planning data
S2 selecting digital modules
S3 associating the selected digital modules
S4 determining an expected maintenance need
S5 generating a maintenance schedule
S6 validating the generated maintenance schedule offline
S7 receiving online condition data
S8 validating the generated maintenance schedule
S9 checking if adjusting the selection of physical modules is possible
S10 suggesting an adjustment of operation

What is claimed is:

1. An automated maintenance schedule generation method, comprising the steps:

receiving, by a control unit, planning data for designing a modular plant comprising at least one physical module as received planning data, wherein the planning data comprises planning constraints of the physical module, a part of the physical module and/or the modular plant, which the design of the modular plant has to fulfill as suggested physical modules;

suggesting, by the control unit, physical modules from a pool of available physical modules depending on the received planning data;

selecting, by the control unit, digital modules, correlating to respective physical modules, from the suggested physical modules, depending on the received planning constraints as respective correlating physical modules, the digital modules comprising maintenance information of the respective correlating physical modules;

associating, by the control unit, the selected digital modules depending on the received planning data;

determining, by the control unit, an expected maintenance need comprising an expected maintenance issue and/or an expected maintenance issue date for the selected physical modules depending on the received maintenance information as a determined maintenance need; and generating, by a computerized maintenance management system (CMMS), a maintenance schedule for the modular plant depending on the determined maintenance need.

2. The method of claim 1, further comprising:
determining an expected downtime of maintenance and/or an expected costs of maintenance by the computerized maintenance management system.

3. The method of claim 1, wherein the maintenance information comprises an age of the physical module, preventive maintenance cycles of the physical module, lease costs of the physical module, availability of predictive maintenance support of the physical module, a maintenance history of the physical module, recurring issues of the physical module, a model usage history of the physical module, and/or a last known condition data of the physical module.

4. The method of claim 1, wherein the maintenance need comprises initial cleaning and/or repeated cleaning of the physical module between each production run and/or unavoidable reconfiguration of the modular plant.

5. The method of claim 1, further comprising:
generating the maintenance schedule before the modular plant is assembled and the physical modules start communicating.

6. The method of claim 1, further comprising:
providing a simulation model of the digital module, configured for predicting the maintenance need.

7. The method of claim 6, further comprising:
receiving the simulation model from an external source for a refurbished physical module and/or from a module rental company from which the physical module is leased.

8. The method of claim 7, wherein the external source comprises a module vendor.

9. The method of claim 1, further comprising:
receiving the predicted maintenance need from the selected physical module itself.

10. The method of claim 1, wherein the planning constraints comprise an age of the module, a time to maintenance of the physical module, a time to repair the physical module, costs of the physical module, and/or availability of predictive maintenance support of the physical module.

11. The method of claim 1, further comprising:
receiving production targets of the modular plant having to be achieved by a design of the modular plant;
validating the generated maintenance schedule offline, based on the production targets, thereby providing offline validation data; and
adjusting the selection of digital modules for the modular plant based on the offline validation data.

12. The method of claim 1, further comprising:
receiving online condition data of the physical modules, relating to a real condition of the physical modules in view of its maintenance needs, when the modular plant is assembled and the physical modules start communicating;
validating the generated maintenance schedule based on the online condition data online, thereby providing online validation data; and
adjusting the selection of physical modules for the modular plant based on the online validation data.

13. The method of claim 12, further comprising:
checking if adjusting the selection of physical modules is possible in view of the operation of the modular plant; and
suggesting an adjustment of operation of the modular plant if adjusting the selection of the physical modules is not possible.

14. A control device configured to execute the method of claim 1.

15. The control device of claim 14, comprising:
a computerized maintenance management system (CMMS) and/or a distributed control system (DCS).

16. An automated maintenance schedule generation method, comprising the steps:
receiving, by a control unit, planning data for designing a modular plant comprising at least one physical module as received planning data;
selecting, by the control unit, digital modules, correlating to respective physical modules, from a database, depending on the received planning data as respective correlating physical modules, the digital modules comprising maintenance information of the respective correlating physical modules;
providing, by the control unit, a simulation model of the digital module, configured for predicting the maintenance need;
receiving, by the control unit, the simulation model from an external source for a refurbished physical module and/or from a module rental company from which the physical module is leased;
associating, by the control unit, the selected digital modules depending on the received planning data;
determining, by the control unit, an expected maintenance need comprising an expected maintenance issue and/or an expected maintenance issue date for the selected physical modules depending on the received maintenance information as a determined maintenance need; and
generating, by a computerized maintenance management system (CMMS), a maintenance schedule for the modular plant in response to the determined maintenance need.

17. An automated maintenance schedule generation method, comprising the steps:
receiving, by a control unit, planning data for designing a modular plant comprising at least one physical module as received planning data, wherein the planning data comprises planning constraints of the physical module, a part of the physical module and/or the modular plant, which the design of the modular plant has to fulfill as suggested physical modules;

suggesting, by the control unit, physical modules from a pool of available physical modules depending on the received planning data;

selecting, by the control unit, digital modules, correlating to respective physical modules, from the suggested physical modules, depending on the received planning constraints as respective correlating physical modules, the digital modules comprising maintenance information of the respective correlating physical modules;

associating, by the control unit, the selected digital modules depending on the received planning data;

determining, by the control unit, an expected maintenance need comprising an expected maintenance issue and/or an expected maintenance issue date for the selected physical modules depending on the received maintenance information as a determined maintenance need; and automatically generating, by a computerized maintenance management system (CMMS), a maintenance schedule for the modular plant in response to the determined maintenance need.

\* \* \* \* \*